June 6, 1933.  H. GUINOT  1,913,159
PRODUCTION OF MESITYL OXIDE
Filed July 23, 1930
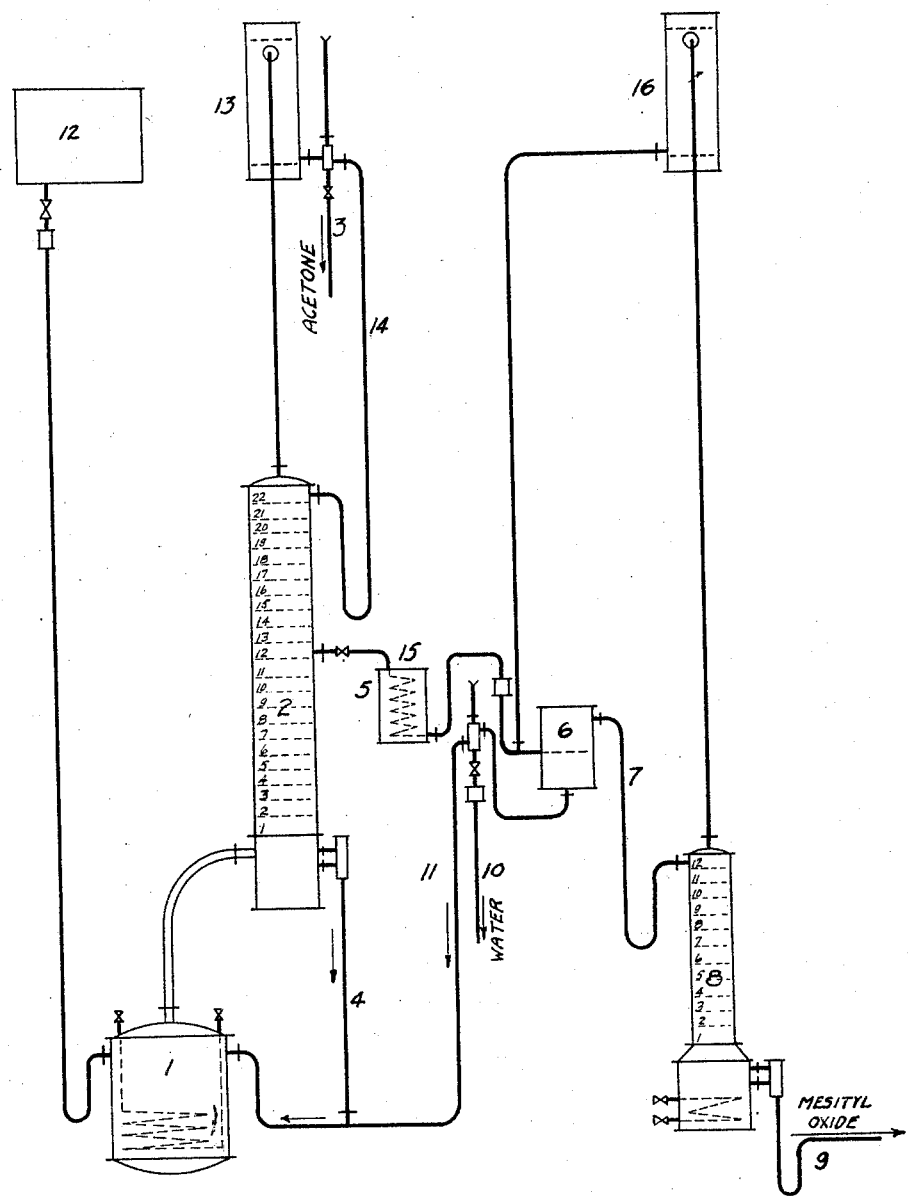
INVENTOR.
Henri Guinot
BY
Francis M. Crawford ATTORNEYS.

Patented June 6, 1933

1,913,159

UNITED STATES PATENT OFFICE

HENRI GUINOT, OF MELLE (DEUX-SEVRES), FRANCE

PRODUCTION OF MESITYL OXIDE

Application filed July 23, 1930, Serial No. 470,027, and in France December 23, 1929.

The present invention relates to a process of manufacturing mesityl oxide. More particularly, it refers to a continuous process for producing mesityl dioxide from diacetone alcohol.

It is well known that the present direct methods of making mesityl oxide from acetone do not give high yields. It is better to convert the acetone first into diacetone alcohol and then transfer the latter into mesityl oxide (Organic Synthesis, an annual publication of satisfactory methods for the Preparation of Organic Chemicals—John Wiley and Sons, New York, vol. 1, (1921), pp. 45, 47, 53, 54).

The conversion of diacetone alcohol into mesityl oxide may be effected by adding a very small quantity of various reagents acting as dehydrating catalysts such as, for example, zinc chloride, concentrated phosphoric acid, concentrated sulphuric acid (Kohn Ger. Pat. No. 208,635 of 1907), concentrated hydrochloric acid (Hoffman U. S. Pat. No. 1,474,035 of 1922), iodine (Hibbert, Jour. Amer. Chem. Soc. 37, 1915, 1755) and then distilling slowly.

In the employment of all of these processes there is always observed the formation of a certain quantity of undesirable condensation products, which is no doubt due to the fact that the concentration of the catalyst in the reaction medium increases very markedly as the distillation progresses. Furthermore, in such processes the yield of mesityl oxide is proportionately less on account of the formation of the relatively large quantity of acetone due to the depolymerization of the diacetone alcohol (Organic Syntheses loc. cit.).

According to the present invention these disadvantages are overcome with the result that nearly quantitative yields of pure mesityl oxide are obtained.

The process which will be set forth in detail hereafter consists essentially in carrying out the continuous decomposition of the diacetone alcohol by heating it to boiling point in the presence of a considerable excess of water containing a small quantity of catalyst.

The operation is carried out in a heated reaction vessel which is supplied continuously with diacetone alcohol which is gradually converted into water and mesityl oxide. The latter compound forms with water a mixture of minimum boiling point, boiling at 91.5° C., and is rapidly eliminated from the zone of reaction. In order that the azeotropic mixture can continue to be formed indefinitely, it is necessary that there should always be sufficient water in the reaction vessel, the water formed in the reaction being itself not sufficient to insure this condition. The mixture, water and mesityl oxide, is separated by a distillation system whose elements are conveniently combined in order to profit from the fact that the mixture of minimum boiling point (or mixture of similar composition) can be separated into two constituents by decantation, while the diacetone alcohol carried off with the vapors issuing from the reaction vessel is constantly refluxed back into the latter. The water-mesityl oxide azeotropic mixture consists of 69% mesityl oxide and 31% water. This mixture separates, on standing, into two layers—the upper one being mesityl oxide saturated with water, and the lower one being water containing less than 1% of mesityl oxide.

From the facts presented above it will be readily seen that on account of the large proportion of water, which the mixture of minimum boiling point contains the water required to form the azeotropic mixture would soon be completely removed from the reaction vessel, thus leading to the principal faults of previous processes unless some provision is made to supply additional water to the reaction mixture. According to the present invention, it is necessary to return to the reaction vessel the excess water entrained by the azeotropic mixture in a manner so as to maintain always substantially constant the composition of the reacting mixture.

It is the combination of these arrangements that permits the almost complete avoidance of the depolymerization of diacetone alcohol into acetone and the production of highly condensed or resinous products.

Below will be cited an example of a preferred method of carrying out the present invention. It is distinctly understood, however, that the procedure outlined is given merely as an illustration and that the invention is in no way limited by the specific procedure specified, and that it is desired to claim as within the scope of the invention the usual equivalents which would naturally occur to one skilled in the art.

Into a heated reaction vessel (1) shown in the accompanying diagram, there is placed:

|  | Parts |
|---|---|
| Diacetone alcohol | 10 |
| Water | 10 |
| Phosphoric acid (45° Bé.) | 1 |

Upon heating this mixture to boiling, the diacetone alcohol is gradually transformed into mesityl oxide which distills forming with the water present a mixture of minimum boiling point, boiling at 91.5° C., which contains 69.4 parts mesityl oxide.

The production of acetone is insignificant, but as the diacetone alcohol employed often contains a little of it, it is necessary to provide for its elimination.

For this purpose the vapors issuing from the reaction vessel (1) are sent to the lower part of column (2), at the upper portion of which they are condensed by the condenser (13). The liquid resulting from this condensation is refluxed by the pipe (14) back to the upper part of the column where the acetone gradually collects and is drawn off by pipe (3) at a convenient rate.

The liquid flowing down to the bottom of the column (2) returns to the reaction vessel by pipe (4) carrying with it the diacetone alcohol which may have been entrained by the vapors issuing from the reaction vessel.

The binary mixture, water and mesityl oxide, collects in the middle portion of the column, whence it is run off into the decanter (6) after being cooled in the coil (5) immersed in the cooling tank (15). The liquid separates into two layers, the upper layer of which consists of mesityl oxide saturated with water and is sent through pipe (7) to the top of the heated column (8). The pure mesityl oxide flows out from the bottom of this column by pipe (9). At the top of this column there is obtained a mixture consisting of water and mesityl oxide, which is sent to the decanter (6) after passing through condenser (16).

The lower layer consisting of water saturated with mesityl oxide is divided into two parts. One part corresponding to the water formed in the reaction vessel is eliminated from the apparatus by pipe (10); it can be treated in a continuous or discontinuous manner for the recovery of the mesityl oxide; the other part is refluxed to the reaction vessel by pipe (11).

The diacetone alcohol which leaves the reaction vessel in the form of mesityl oxide is replaced at the same rate by fresh diacetone alcohol coming from the supply tank (12). The reaction can be continued in this manner indefinitely, the water and phosphoric acid in the reaction vessel always remaining in their original concentrations. Under these conditions the yield of pure mesityl oxide reaches approximately 96% of the theoretical.

If desired, both the procedure and apparatus outlined above may be modified somewhat without departing from the scope of the present invention. For example in the distillation portion of the process and apparatus the usual modifications of both apparatus and method of operating used in other azeotropic processes such as used in the dehydration of alcohols, acetic acid or other substances may be employed. Furthermore, if desired, the separation of the mixture of water and mesityl oxide may be carried out as an independent continuous or discontinuous operation.

In a general way the process is applicable also to the manufacture of the homologues of mesityl oxide.

Now having described my invention, what I desire to claim is:

1. In a continuous process for the production of mesityl oxide, the step which comprises heating diacetone alcohol in the presence of a dehydration catalyst and sufficient water to form an azeotropic mixture with the mesityl oxide formed during the reaction.

2. In a continuous process for the production of mesityl oxide, the step which comprises heating diacetone alcohol in the presence of phosphoric acid and sufficient water to form an azeotropic mixture with the mesityl oxide formed during the reaction, and maintaining the reaction mixture at a substantially constant composition.

3. In a continuous process for the production of mesityl oxide, the steps which comprise supplying continuously with diacetone alcohol and water a heated reaction vessel containing a dehydration catalyst and distilling off as a component of an azeotropic mixture the mesityl oxide formed during the reaction.

4. In a continuous process for the production of mesityl oxide, the step which comprises eliminating continuously the water formed by the reaction, and returning to the reaction vessel the excess of water which has been removed in the form of the azeotropic mesityl oxide-water mixture.

5. In a continuous process for the production of mesityl oxide, the step which comprises returning to the reaction vessel the unconverted diacetone alcohol entrained by the vapors of mesityl oxide and water.

6. In a continuous process for the production of mesityl oxide, the step which comprises maintaining the reaction mixture at a substantially constant composition.

7. In a continuous process for the production of mesityl oxide, the step which comprises removing acetone formed during the reaction previous to the removal of the mesityl oxide as a component of a constant boiling mixture with water.

8. In a continuous process for the production of mesityl oxide, the step which comprises heating diacetone alcohol in the presence of a dehydrating catalyst and sufficient water to form an azeotropic mixture with the mesityl oxide formed during the reaction and maintaining the reaction mixture at a substantially constant composition.

In testimony whereof I affix my signature.

HENRI GUINOT.